UNITED STATES PATENT OFFICE.

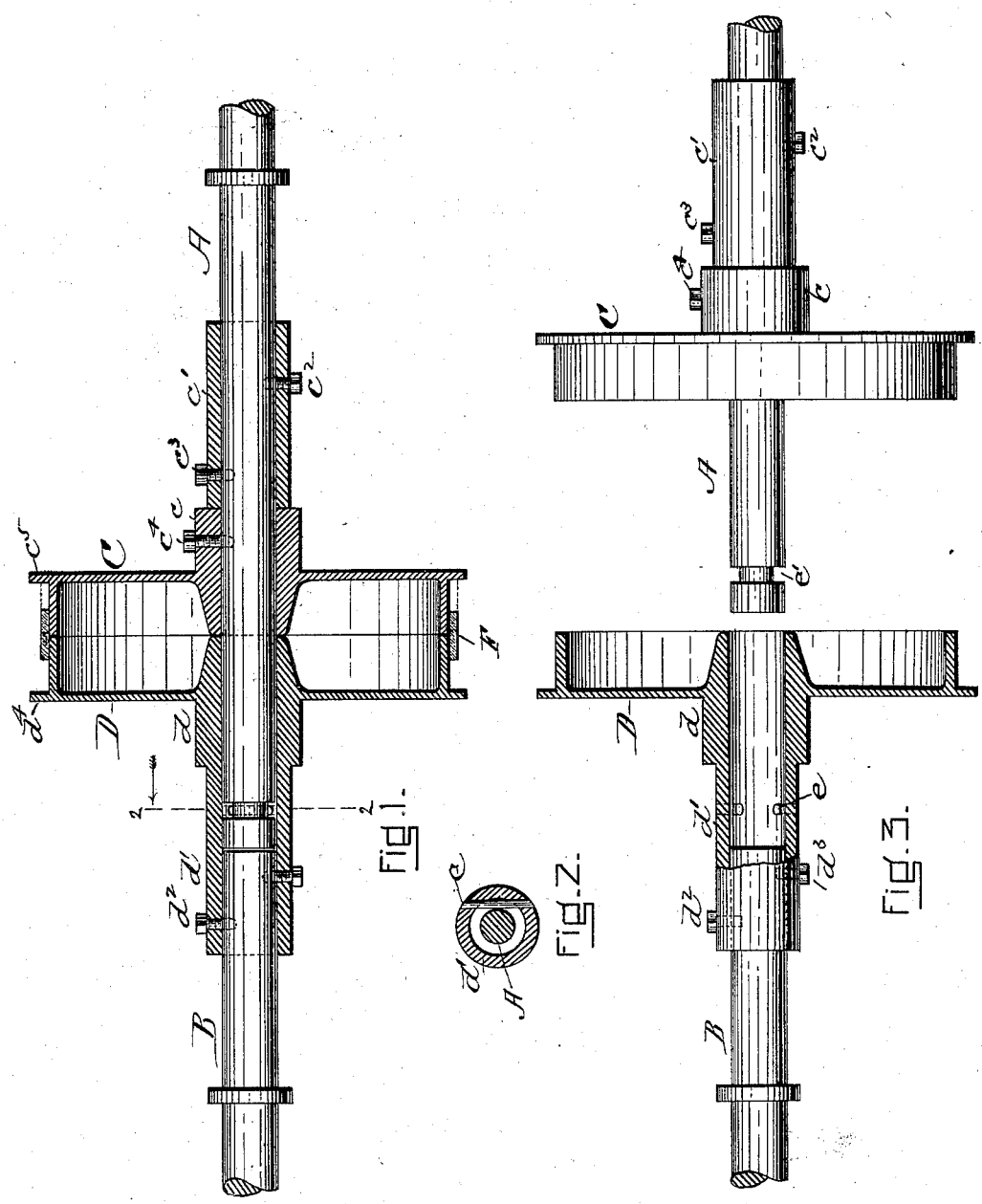

DAVID M. LITTLE, OF SALEM, MASSACHUSETTS.

AXLE FOR AUTOMOBILES OR OTHER POWER-VEHICLES.

SPECIFICATION forming part of Letters Patent No. 691,908, dated January 28, 1902.

Application filed April 3, 1901. Serial No. 54,172. (No model.)

*To all whom it may concern:*

Be it known that I, DAVID M. LITTLE, of Salem, in the county of Essex and State of Massachusetts, have invented a new and useful Improvement in Axles for Automobiles or other Power-Vehicles, of which the following is a specification.

My invention relates to means for conveying power to the power-axle from the power-shaft of the engine or a counter-shaft by means of which the automobile is moved. By "power-axle" I mean the axle upon which one pair of wheels is fastened and to which the power-shaft of the engine is geared. The trouble to be overcome lies in the fact that when both wheels are fast to the power-axle in turning a corner one of the wheels is obliged to travel a less distance than the other, and consequently there is at these times considerable strain upon the connection between the power-shaft and the power-axle. Power has usually been conveyed by means of a chain and sprockets, and the result of the strain referred to has been to cause a serious strain and wear both upon the chain and sprocket-teeth and also at times to cause the chain to travel independently of the sprocket on the power-axle. My invention is intended to overcome this difficulty; and it consists in providing each wheel with its own axle, each axle carrying a section of a pulley, the two sections being available to carry one belt. I have found that where this construction is used when the rotation of one of the wheels is retarded because the vehicle is passing around a corner the tendency of the belt is to slip to that section of the pulley which is retarded and apply power thereto, resuming its position when the direction of movement of the vehicle becomes straight again. Thus at that instant power is applied where it is most needed.

My invention will be understood by reference to the drawings, in which—

Figure 1 is a longitudinal section of the pulley mechanism above referred to, the two portions of the axle being shown in elevation. Fig. 2 is a cross-section on line 2 2 of Fig. 1, Fig. 3 showing the parts separated, one of the parts being partly in section and the other in elevation.

The complete power-axle itself is made in two parts or axles, preferably in the manner shown, A being one axle and B being the other. The outer ends of the axles to which the wheels are to be attached are broken off, as the wheels and their attachment are of ordinary construction and need not be shown. It is to be understood, however, that each wheel is fast to its axle.

C D are two sections which together form a pulley. Each section is provided with a hub $c$ $d$, the hub $d$ being extended into a sleeve $d'$. The sleeve $c'$ is separate from its hub and is connected by set-screws $c^2$ $c^3$ to the axle A to hold the section C from endwise movement thereon. A set-screw $c^4$ attaches the hub and section C to the axle A. The section D is held in place on the axle B by means of set-screws $d^2$ $d^3$. The axle A is held in place with relation to the axle B within the sleeve $d'$ by means of a key $e$ passing through the sleeve $d'$ and running in a suitable groove $e'$ near the end of the axle A. It will be noted that as the result of this construction the axle A is caused to abut against the end of the axle B by means of the key $e$ and its groove and the sleeve $d'$, the key holding the end of the axle A within the sleeve $d'$, the axle B being also attached to the sleeve $d'$ by means of the screws $d^2$ $d^3$. It will also be seen that this arrangement allows each axle A B to rotate independently and carry with it its section C D of the pulley.

F is a belt which runs over the pulley C D and transmits power to it from the power-shaft in the usual manner. This belt is somewhat narrower than the width of the pulley, so that it may slide to one side or the other of the groove formed by the rims $c^5$ $d^4$. When one of the wheels is retarded on turning a corner or turning the vehicle around, this belt will slide sidewise on the pulley to that section which is retarded, thus applying approximately full speed thereto and to the retarded wheel, thus overcoming the retardation, and substantially maintaining the speed of the vehicle, this same action of the belt freeing the other section of the pulley and its wheel, so that while the curve is being turned it may rotate more rapidly to keep up with the speed of the wheel on the inside of the curve. When the vehicle begins its straight course again, the parts will move with uniform resistance and the belt will slide back to its normal position and transmit power equally to both sections of the pulley and the wheels connected therewith.

As the shaft from which the belt receives power is of ordinary and well-known construction it has seemed unnecessary to show it or the belt in full.

It is evident that the details of my invention may be carried out in other ways than those shown, the chief feature of my invention being a sectional pulley one portion of which is connected to the axle carrying one wheel and the other portion of which is attached to the axle carrying the other wheel, the two axles being arranged to rotate separately and both receiving power through the sectional pulley from the source of power, yet each section being adapted to have a movement independent of the other, this being used in conjunction with a belt, as described.

What I claim as my invention is—

1. A compound power-axle composed of two axles each adapted to rotate independently of the other, and a pulley comprising two abutting sections, each section being mounted upon one of said axles, whereby power applied to either pulley-section will cause its axle to rotate independently of the other axle.

2. A compound power-axle composed of two axles each abutting against, and adapted to rotate independently of, the other, and a pulley comprising two sections, each section being mounted upon and adapted to rotate with one of said axles, as described.

3. A compound power-axle composed of two axles each adapted to rotate independently of the other, one axle having a section of a pulley fast thereon and a section of a pulley loose thereon, said loose section of said pulley being connected to the other axle of said compound power-axle, as described.

4. A compound power-axle composed of two axles A, B, each adapted to rotate independently of the other, in combination with a pulley composed of two sections, one section being fast upon one of said axles A, the end of said axle A projecting through it and extending beyond it, the other section being attached to the end of the axle B and projecting beyond it and forming a socket to receive the end of said axle A, and means for holding the ends of said axles together and allowing each to turn independently of the other, as and for the purposes described.

5. A compound power-axle comprising two independently-rotatable axles, in combination with a pulley made in two sections, each section being provided with a sleeve extending laterally therefrom, each sleeve being attached to one of said axles to rotate therewith, and one of said axles being attached to the sleeve on the opposing axle in the manner described, whereby it may rotate independently thereof but be prevented from endwise movement therein, as set forth.

6. A compound axle composed of two abutting axles held from endwise movement each being adapted to turn independently of the other, a pulley comprising two sections, one section being mounted upon each of said axles, said pulley-sections abutting, in combination with a single belt adapted to slide sidewise on said pulley, and adapted to transmit power from a suitable source, as and for the purposes set forth.

7. A compound axle comprising two abutting axles held from endwise movement, each being adapted to turn independently of the other, and a pulley comprising two sections, each mounted upon one of said axles, said pulley-sections abutting, in combination with a single belt adapted to communicate motion from a suitable source of power to both of said sections or to either section, as described.

8. A compound axle comprising two abutting axles held from endwise movement, each being adapted to turn independently of the other, and each carrying a section of a pulley, said pulley-sections abutting, in combination with a belt narrower than the width of said pulley, and adapted to slide sidewise thereon to communicate motion from a suitable source of power to either or both sections thereof, as set forth.

9. A compound axle comprising two abutting axles held from endwise movement, each being adapted to turn independently of the other, and means whereby the retarding of the movement of one axle will cause an increase of power to be applied thereto, said means consisting of a sectional pulley composed of two sections, one section being fast upon each axle, and a belt, adapted to slide laterally on said pulley, and onto the retarded section thereof and communicate power thereto from a suitable source, as and for the purposes set forth.

10. A compound axle comprising two abutting axles held from endwise movement, each being adapted to rotate independently of the other, and means whereby one or both of said axles may be maintained at a constant speed of rotation, said means comprising a sectional pulley, one section of which is fast upon one of said axles and the other section upon the other axle, and a belt slidable laterally upon said pulley and adapted to transmit power from a suitable source, whereby when both axles are turned against the same resistance said belt will engage both sections of said pulley, but when resistance is applied to one of said axles, said belt will slide laterally upon the section of the pulley carried by the axle to which resistance is applied, as set forth.

DAVID M. LITTLE.

Witnesses:
FRANK V. WRIGHT,
THOMAS C. KEOHAN.